Patented Mar. 31, 1953

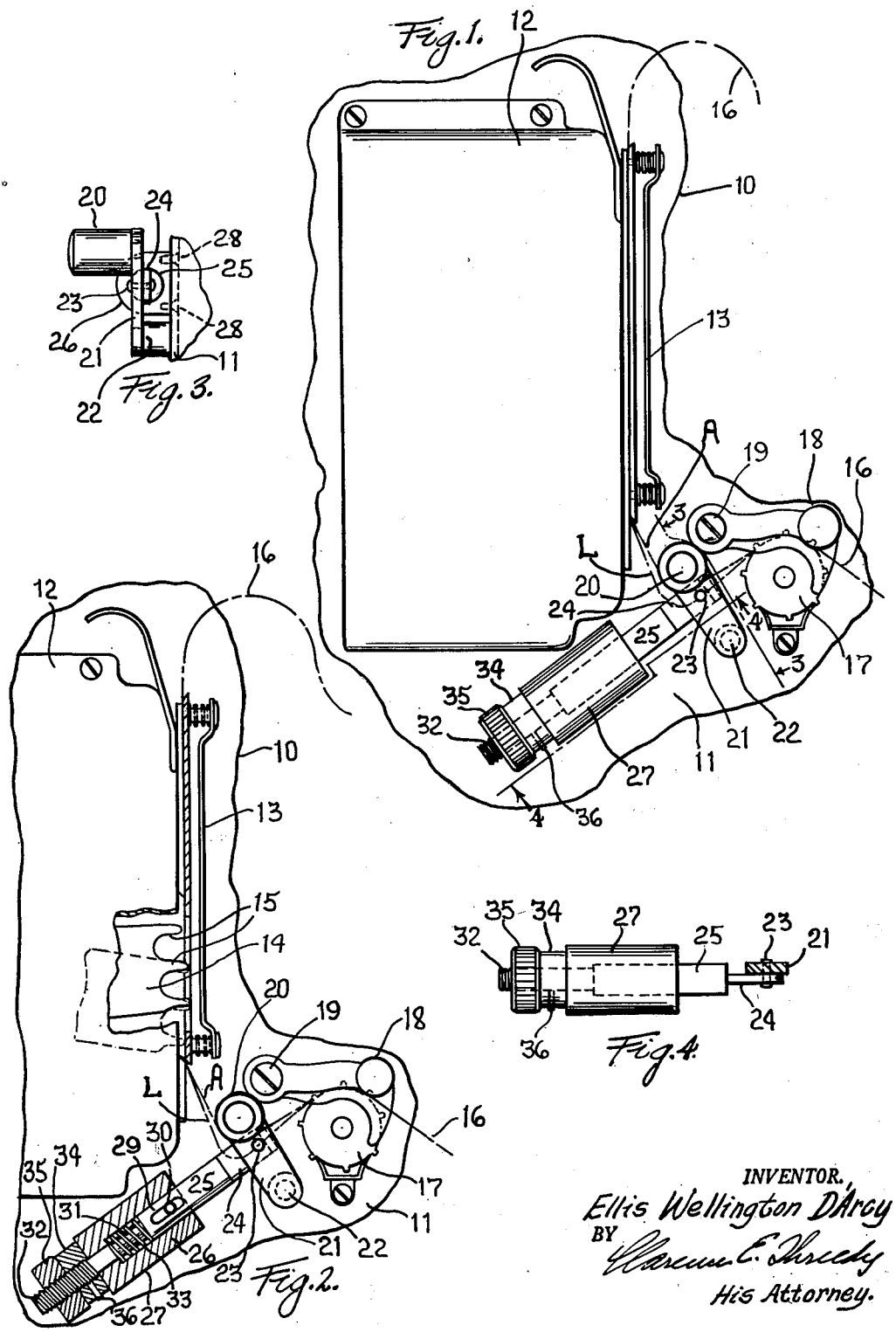

2,633,356

UNITED STATES PATENT OFFICE 2,633,356

MECHANISM FOR FORMING A LOOP IN THE WEB OF A FILM OF A MOTION-PICTURE MACHINE

Ellis Wellington D'Arcy, Chicago, Ill., assignor to De Vry Corporation, Chicago, Ill., a corporation of Illinois Application November 22, 1947, Serial No. 787,556

2 Claims. (Cl. 271—2.3)

This invention relates to certain new and useful improvements in mechanism for forming a loop in the web of a film of a motion picture machine during the operation thereof, and has for its principal object the provision of an improved construction of this character which will be highly efficient in use.

The principal object of the invention is to provide a mechanism which will effect forming of a loop without discontinuing the operation of the motion picture machine.

Another and equally important object is the provision for forming a loop in a film web by mechanism which is simple in structure and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary side elevational view of a conventional motion picture machine showing my invention associated therewith;

Fig. 2 is a view similar to Fig. 1, but showing certain parts thereof in sectional detail;

Fig. 3 is a fragmentary detail view taken substantially on line 3—3 of Fig. 1; and Fig. 4 is a fragmentary detail view taken substantially on line 4—4 of Fig. 1.

The several objects of my invention are accomplished by the preferred form of construction shown in the accompanying drawings and in which, to illustrate my invention, I have shown a conventional motion picture projecting machine at 10. This machine includes a wall 11, a projecting housing 12, and a film gate 13. Within the housing 12 is operated by means well known in the art, a film feed claw 14 comprising a plurality of fingers 15 which are adapted to engage the perforations formed in a film strip 16 of a standard construction, whereby to intermittently feed the film strip through the film gate 13.

A feed sprocket is indicated at 17 and serves to deliver film away from the gate 13. The film is held in proper relation with respect to this sprocket 17 by a pressure roller 18 pivotally supported as at 19 from the wall 11. The foregoing construction is found to be included in most standard motion picture projecting machines.

My invention has to do with the mechanism for forming a loop in the web of film between the film gate and the sprocket 17. This mechanism includes a roller 20. This roller 20 in the preferred form of construction is supported by a link 21 pivotally connected to the wall 11 as at 22. Pivotally connected to the link 21 by means of a pin 23, is the reduced end portion 24 of a shaft 25. This shaft 25 projects within a bearing 26 comprising a cylindrical body 27 secured to the wall 11 in any suitable manner, such for example by suitable screws 28 or the like. The shaft 25 has a slot 29 formed therein, and positioned in this slot 29 and carried by the cylindrical body 27 is a stop pin 30 which limits the projection of the shaft 25 from within the bearing 26. The shaft 25 terminates into a reduced portion 31, a portion of which bears threads 32. Upon this reduced portion and arranged within the cylindrical body 27 is an expansion spring 33. Threaded upon the thread-bearing portion of the reduced portion 31 is a vernier nut 34, and outwardly of this nut 34 is a lock nut 35. The vernier nut is provided with a suitable set screw 36 by means of which the nut 34 may be secured in an adjusted position upon the thread-bearing portion of the reduced portion 31 of the shaft 25.

The roller 20 is located with respect to the claw 14 in a manner such that should the web section indicated at A between the film gate and the sprocket 17 become taut, the downward movement of the claw 14 will automatically effect a loop L in this web section so that each time the loop L is dissipated for any reason, the claw in its downward operative movement in film-feeding direction, will automatically present beneath the roller 20 a loop.

By this arrangement the operation of the motion picture machine need not be discontinued as and when the loop L is dissipated nor is it necessary that the attention of the operator of the machine be directed to forming this loop, as it is manifest that the loop is formed by the action of the claw in operation to feed the film into film-feeding direction. Once the location of the roller 20 is determined for a proper loop, the roller may be fixed against movement from that position by the action of the film due to becoming taut by means of the lock nut 35 threaded against the vernier nut 34. The adjustability of the shaft 25 permits finding the proper location of the roller 20 with the minimum degree of time and labor upon the part of the operator. Once this location is fixed, the operator need not concern himself with the presence or absence of the loop L, as the loop L if dissipated will always be formed by the action of the claw 14.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a combination comprising a roller adapted to engage a web portion of a film of a motion picture projecting machine, an arm pivotally supporting the roller for engagement with said web, a cylindrical body fixed to a wall of said machine, a shaft mounted for longitudinal movement relative to the body and having one end portion pivotally connected to said arm, said shaft having an elongated slot formed in the direction of its long axis, a pin carried by the body and projecting through the slot, and means for adjusting said shaft relative to said body.

2. In a combination comprising a roller adapted to engage a web portion of a film of a motion picture projecting machine, an arm pivotally supporting the roller for engagement with said web, a cylindrical body fixed to a wall of said machine, a shaft mounted within said body for movement relative thereto and having one end portion pivotally connected to said arm, a slot and pin connection between the shaft and the cylindrical body to limit movement of the shaft relative to the body, means for adjusting said shaft relative to said body, and spring means in said body and embracing said shaft to project said shaft in one direction relative to said body.

ELLIS WELLINGTON D'ARCY.

REFERENCES CITED

The following references are of record in the file of this patent:

UNITED STATES PATENTS

| Number | Name | Date |
|---|---|---|
| 481,536 | Winton | Aug. 23, 1892 |
| 836,389 | Lotterhand | Nov. 20, 1906 |
| 1,165,629 | Schneider | Dec. 28, 1915 |
| 1,847,720 | Marcellis | Mar. 1, 1932 |
| 2,037,452 | Boecking | Apr. 14, 1936 |
| 2,039,906 | Howell | May 5, 1936 |
| 2,071,878 | Huc | Feb. 23, 1937 |
| 2,121,080 | Galkin | June 21, 1938 |
| 2,431,681 | Barstow | Dec. 2, 1947 |

FOREIGN PATENTS

| Number | Country | Date |
|---|---|---|
| 306,936 | Italy | Apr. 5, 1933 |
| 594,189 | France | June 13, 1925 |